Feb. 3, 1970  D. S. CLARKE ET AL  3,492,693
MANUFACTURE OF EXTRUDED PLASTIC TUBE OR FILM
Filed Nov. 13, 1967  2 Sheets-Sheet 1

INVENTORS
DERRICK STUART CLARKE &
ALAN HARVEY HALL
by
BIERMAN & BIERMAN

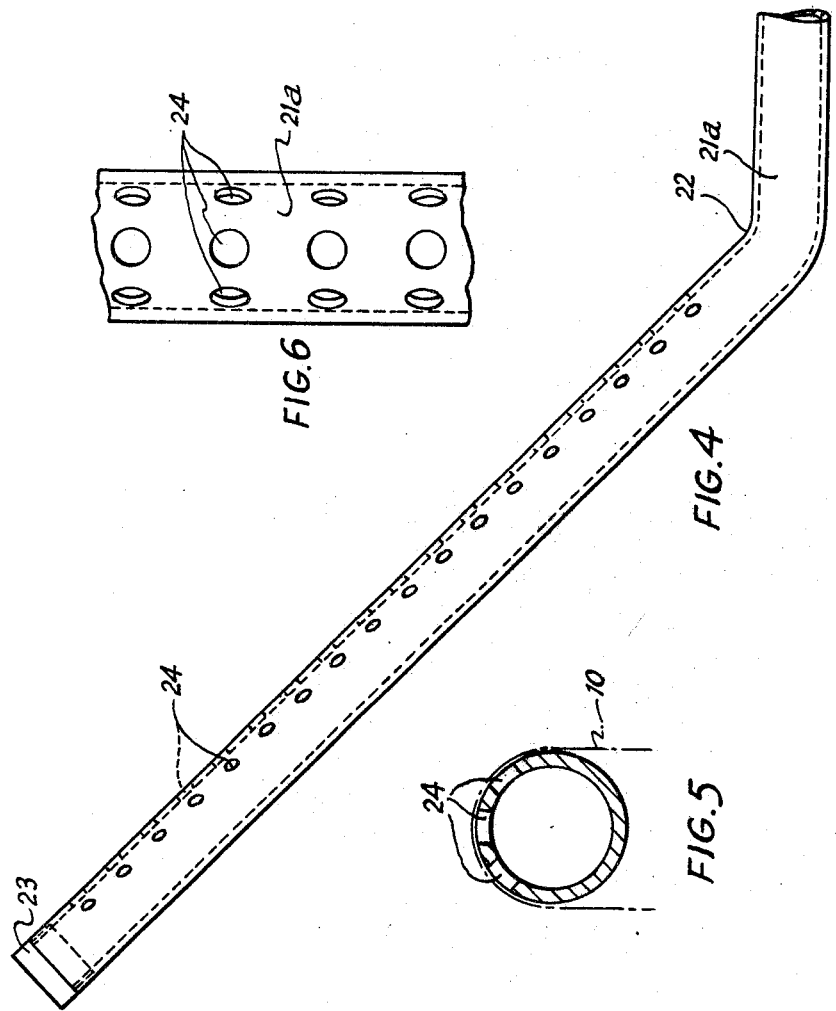

United States Patent Office 3,492,693
Patented Feb. 3, 1970

3,492,693
MANUFACTURE OF EXTRUDED PLASTIC
TUBE OR FILM
Derrick S. Clarke, Harwood, near Bolton, and Alan H. Hill, Darlington, England, assignors to General Engineering Company (Radcliffe) Limited, a corporation of Great Britain
Filed Nov. 13, 1967, Ser. No. 682,095
Claims priority, application Great Britain, Nov. 12, 1966, 50,820/66; May 16, 1967, 22,602/67
Int. Cl. B29d 7/02, 7/26
U.S. Cl. 18—14                    8 Claims

ABSTRACT OF THE DISCLOSURE

Apparatus for the manufacture of extruded plastic tube or film having take-off rollers and means for imparting an oscillating movement to the take-off rollers so as to apply a torsional characteristic to the tube or film between the extrusion die and such rollers characterized in that guide means are provided after the said take-off rollers and so arranged as to re-orient the extruded tube or film for lineal movement in a plane parallel to and in a direction normal to the axis of the die, and non-oscillatory reeling or winding mechanism for receiving said re-oriented film.

---

Figure 1:
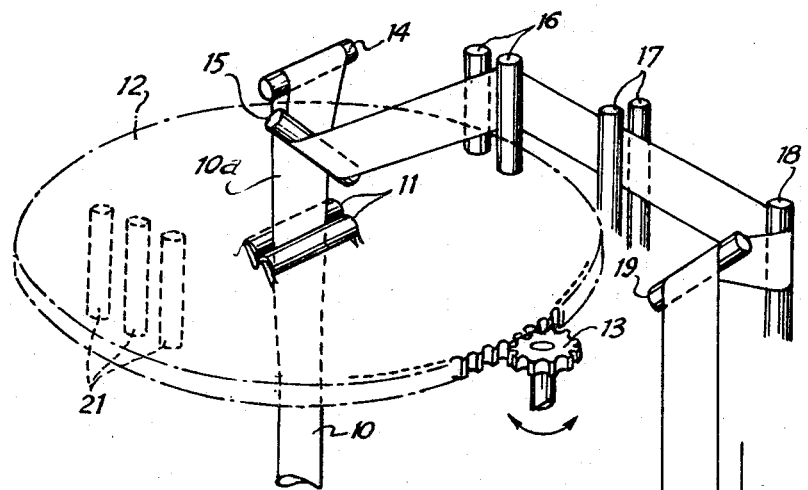

This invention relates to the manufacture of extruded plastic tube or film.

In many instances the plastic tube or film is subsequently printed, and such printing calls for a very high degree of accuracy of film thickness. There are also other uses which call for similar thickness accuracy, as well as for other conditions, as explained later, which are not only detrimental to printing but to other characteristics of the film as a vendable product.

There are however many factors which contribute to inaccuracies of film thickness, particularly as taken across the width of the tube or film produced by slitting the tube, a main factor being some manufacturing tolerances in the extruding dies.

Such tolerances result in thickness errors having a lineal character and when the film or tube is reeled or wound, as is normal, such errors are cumulative resulting in a build-up in diameter in the thicker zones with unequal stressing of the film, so that, when unrolled the film does not lie flat and displays a memory instability which for many purposes is undesirable. It is also found that such irregularities, stresses and distortions adversely affect the optical characteristics of the film and thus its commercial value.

To mitigate such unequal stressing of the film, several proposals have been made to eliminate or partly eliminate the said lineal character of the thickness errors or variations. These include rotating or oscillating a part of the extrusion die, or the take-off roller system so that any lineal fault in the plastic tube is given a helical twist, in consequence of which the thickness errors are caused relatively to traverse across the tube or sheet and thereby lose a major part of their lineal characteristics, which errors are therefore relatively non-cumulative in the reeling or winding operation. Another acknowledged cause of lineal thickness errors is the cooling system for the tube or film which sets the plastic, and rotation of the cooling jets has also been tried with some measure of success.

The greatest success in eliminating the lineal characteristics of thickness errors has so far undoubtedly been achieved as above explained by rotation or oscillation of the die head relative to the take-off rollers, but there are considerable mechanical problems, for instance, in rotating or oscillating any part of the die, especially side-fed dies. While rotation or oscillation of the take-off rollers has hitherto involved the complication of providing similar or simultaneous movement of the reeling or winding mechanism for the tube or film.

The present invention is based upon the appreciation of the possible application of known guide systems for effecting directional changes of disposition and movement of a sheet, such as paper or a textile fabric, for example for reversing the sheet, but in this case to enable the take-up rollers to be oscillated while the tube or film is fed continuously to a relatively stationary reeling or winding system, such oscillation at the same time substantially removing the lineal characteristics aforesaid without the disadvantage of having to rotate or oscillate the reeling or winding mechanism.

According to the invention apparatus for the manufacture of extruded plastic tube or film having take-off rollers and means for imparting an oscillating movement to the take-off rollers so as to apply a torsional characteristic to the tube or film between the extrusion die and such rollers is characterised by guide means after the said take-off rollers, so arranged as to re-orient the extruded tube or film for lineal movement in a plane parallel to and in a direction normal to the axis of the die, and non-oscillatory reeling or winding mechanism for receiving said re-oriented film.

The apparatus aforesaid may be further characterised by further and non-oscillatory guide rollers for the re-oriented tube or film between the re-orienting guide means and the winding mechanism, or further characterised by further re-orienting guide means so arranged as to guide the tube or film at one side of the extrusion axis to winding mechanism located substantially at the same level as the extrusion die, or further characterised by compensating means engageable by the tube or film to compensate for change of lineal velocity thereof due to oscillation of the take-off rollers.

According to a further characteristic of the invention there is provided at least one inclined guide means for turning the tube or film from one plane into another characterised by means for establishing and maintaining an air cushion between the plastic tube or film and the operative surface of such guide means.

Figures 2, 3:
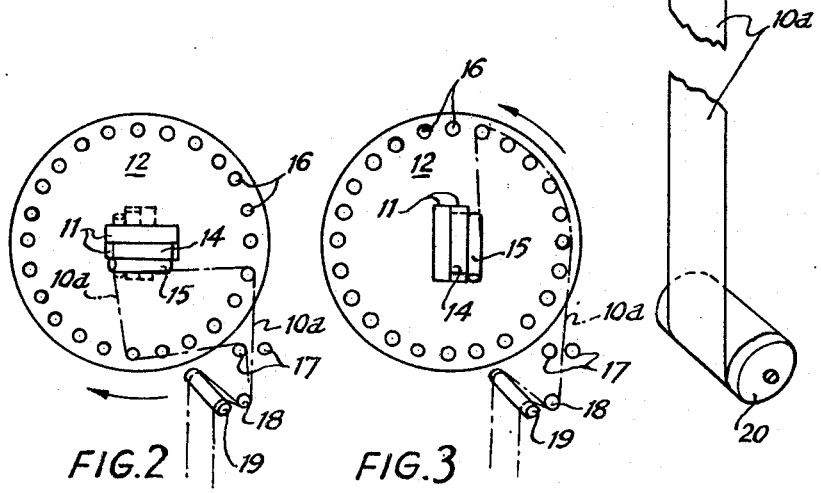

In the accompanying drawings:
FIG. 1 is a diagrammatic perspective view showing one example of the invention. The extruder mechanism itself is not shown.
FIGS. 2 and 3 are diagrammatic plans of the apparatus shown in FIG. 1, and
FIGS. 4, 5 and 6 are detail views of a modification of part of the apparatus of FIGS. 1 to 3.

As shown in the FIGS. 1 to 3 of the drawings extruded tube 10 passes up through conventional nip rollers 11, which are mounted on a platform 12 adapted to be given an oscillatory motion through gearing 13. Also mounted on the platform 12 are guide rollers and turner bars for turning the film on edge and these consist of a roller 14 parallel to the nip rollers 11, an inclined turner bar 15 and pair of rollers 16 parallel to the axis of the tube 10. At one side of the tower, as the extrusion plant is called, are a pair of further guide rollers 17 and further roller 18 parallel to the guide roller 17 and an inclined turner bar 19 arranged to turn the flattened tube 10a through 90 degrees to pass down beside the tower to a reeling mechanism 20.

In operation as the tube 10 is drawn upwards in normal manner by the take-off rollers 11, the platform 12 is given an oscillatory rotation which produces the desired effect of eliminating any linear fault in the film by displacement of such fault so that it is no longer linear when wound up. So that such winding or reeling can be effected without rotating it together with the platform 12, the film passes over a roller 14 parallel to the nip rollers 11 and is then re-oriented through 90 degrees by means of the inclined turner bar 15 and one of the rollers 16 so that it is on edge, and is re-oriented for the second time after passing between the rollers 17 and over the roller 18 by the inclined turner bar 19 to pass down to the winding reel 20. The oscillation of the platform 12 is only limited by possible interference with the inclined turner bar 15, but this can be obviated by mounting a plurality of guide rollers, three of which are shown dotted at 21, similar to one of the rollers 16 arranged around the periphery of the platform 12 so that the flattened film 10a will lie on the outside of such rollers. In this way oscillatory rotation of the platform may extend to nearly 360 degrees before "winding up" could interfere with the passage of the film, see FIGS. 2 and 3.

Whilst the apparatus described above is found to be completely adequate for many purposes it is possible that it will not serve completely to obviate adverse optical characteristics in certain circumstances and thus the refinement of FIGS. 4 to 6 is proposed.

As shown in FIGS. 4 to 6 there is provided modified guide means for turning the plastic tube comprising a tubular stationary guide bar 21a to be used in place of the guide means 15 and 19 of the construction illustrated in FIGS. 1 to 3. The guide bar 21a is bent at 22 to an obtuse angle of 135 degrees. The end of the inclined portion is fitted with a closure plug 23. In the length of the inclined portion are a plurality of radially directed holes 24 which as can be seen from FIG. 5 are located at points disposed at 45 degrees relative to the plane of movement of the extruded plastic tube or film.

In operation it is found that when air at suitable pressure is supplied to the open end of the guide bar 21 to pass out through the series of holes 24 it forms an air cushion between the plastic tube or film and the adjacent surface of the bar so that physical contact with the bar is prevented.

In a modification, a groove or grooves may be formed on the periphery of the guide bar so arranged as to spread the air under the plastic tube or film as it passes out through the holes 24, the better to ensure a continuous air cushion between the plastic tube or film and the adjacent surface of the bar. The number, direction or arrangement of the air holes may be varied from the example herein described and illustrated according to the selected diameter of the guide bar, the available pressure and volume of air supply, the tension applied to the plastic tube or film to be guided thereby and any other factor relevant to the establishment and maintenance of an effective air cushion.

We claim:
1. Apparatus for the manufacture of extruded plastic tube or film having take-off rollers and means for imparting an oscillating movement to the take-off rollers so as to apply a torsional characteristic to the tube or film between the extrusion die and such rollers characterised in that guide means are provided after the said take-off rollers and so arranged as to re-orient the extruded tube or film for lineal movement in a plane parallel to and in a direction normal to the axis of the die, and non-oscillatory reeling or winding mechanism for receiving said re-oriented film.

2. Apparatus as claimed in claim 1, further characterised by the provision of further and non-oscillatory guide rollers for the re-oriented tube or film between the re-orienting guide rollers and the winding mechanism.

3. Apparatus as claimed in claim 1 in which further re-orienting guide means so arranged as to guide the tube or film at one side of the extrusion axis to winding mechanism located substantially at the same level as the extrusion die.

4. Apparatus as claimed in claim 1 in which there are provided compensating means engageable by the tube or film to compensate for change of lineal velocity thereof due to oscillation of the take-off rollers.

5. Apparatus as claimed in claim 1 in which there is provided at least one inclined guide means for turning the tube or film from one plane into another, said guide means being provided with means for establishing and maintaining an air cushion between the plastic tube or film and the operative surface of the guide means.

6. Apparatus as claimed in claim 1 in which there are two re-orienting guide means between the take-off rollers and the reeling mechanism.

7. Apparatus as claimed in claim 1 in which the guide means is in the form of a closed end tube having radially disposed holes in that part of its periphery over which the tube or film is passed.

8. Apparatus as claimed in claim 5 in which the guide means is in the form of a closed end tube having radially disposed holes in that part of its periphery over which the tube or film is passed.

References Cited
UNITED STATES PATENTS

| | | | |
|---|---|---|---|
| 756,600 | 4/1904 | Dodge. | |
| 2,844,846 | 7/1958 | Kronholm | 18—14 |
| 2,928,709 | 3/1960 | Baumeister. | |
| 3,161,942 | 12/1964 | Cheney | 18—14 XR |

WILLIAM J. STEPHENSON, Primary Examiner